Nov. 22, 1927.

J. P. SPANG

MEAT TENDERER

Filed March 5, 1927

Inventor.
Joseph P. Spang
by Heard Smith & Tennant.
Attys.

Nov. 22, 1927.

J. P. SPANG

MEAT TENDERER

Filed March 5, 1927

Inventor.
Joseph P. Spang
by Heard Smith & Tennant.
Attys.

Patented Nov. 22, 1927.

1,649,992

UNITED STATES PATENT OFFICE.

JOSEPH P. SPANG, OF QUINCY, MASSACHUSETTS.

MEAT TENDERER.

Application filed March 5, 1927. Serial No. 173,155.

This invention relates to meat tenderers of the type shown in my Patent No. 1,614,047, dated January 11th, 1927. The meat tenderer shown in said patent comprises a bed on which the meat is supported, a knife carrier pivotally mounted on the bed and movable toward and from the same, a gang of knives slidably carried by the knife carrier, and means for moving said knives relative to the knife carrier thereby to slit the meat.

One of the objects of my invention is to provide a meat tenderer of simplified construction.

Another object of the invention is to provide a meat tenderer having a novel construction which facilitates the removal of the knives for cleaning or grinding purposes.

Other objects of the invention are to provide meat tenderers with improved means for holding the meat in place while it is being acted on by the knives and otherwise to improve meat tenderers all as will be more fully hereinafter set forth and then pointed out in the appended claims.

In the drawings wherein I have illustrated a selected embodiment of my invention, Fig. 1 is a side view of a meat tenderer embodying the invention;

Figure 1:
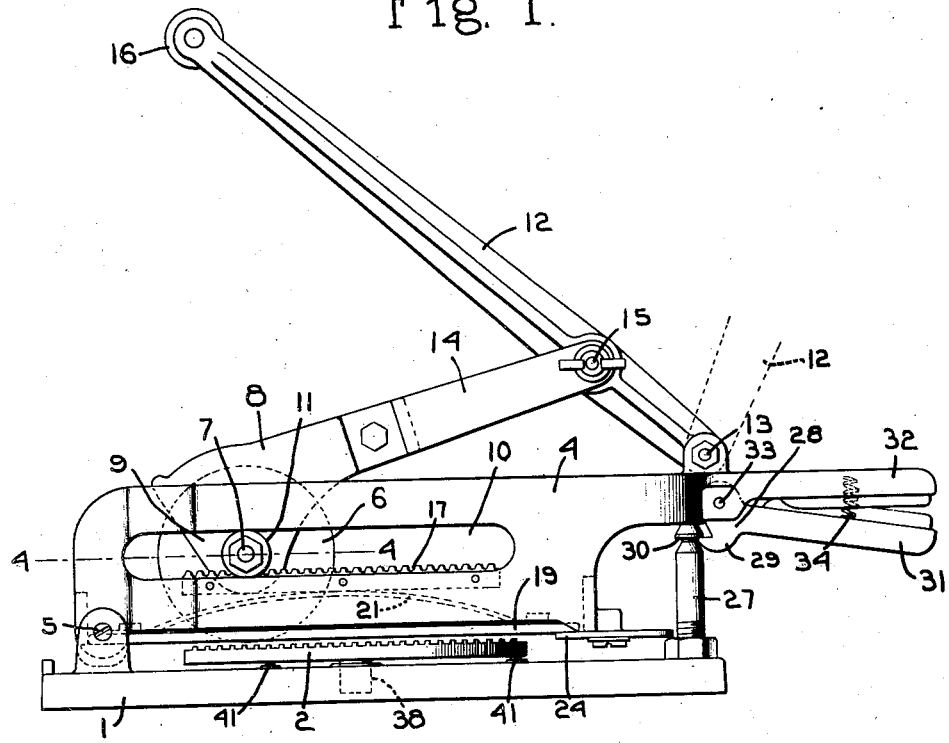
Figure 2:
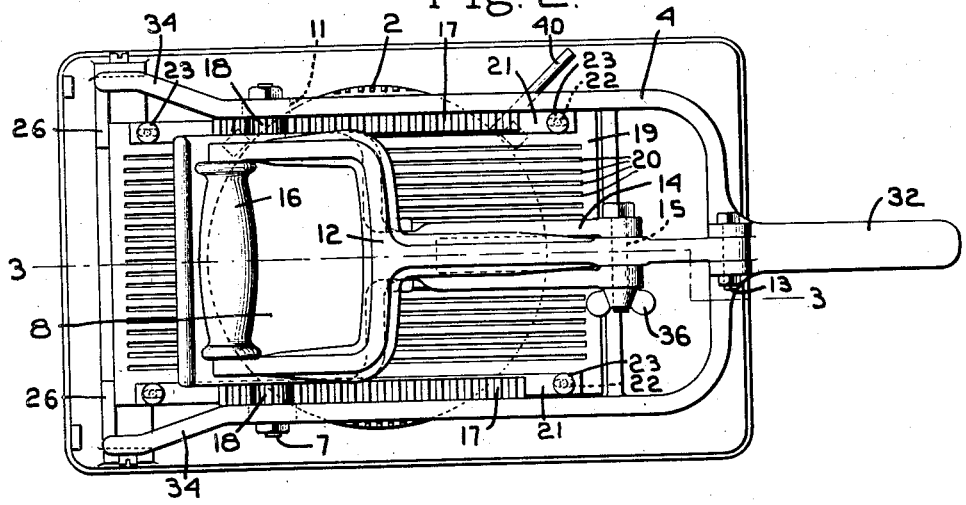
Fig. 2 is a top plan view of Fig. 1.

The device herein illustrated is similar to that shown in my above-mentioned patent in that it comprises a base portion 1 carrying a bed or support 2 on which the meat 3 is supported and a knife carrier 4 which is pivoted to the base at 5 and which supports a gang of knives 6. These knives are shown as circular knives and are rigidly mounted on a shaft 7 which is journalled in a head 8, the head being in the form of a hood which encloses the upper part of the knives and thus forms a guard therefor. This head is formed with the side wings 9 in which the shaft 7 is journalled.

The knife carrier 4 is in the form of a yoke-shaped member, each side of which is provided with a slot 10 in which the ends of the shaft 7 are received, said shaft having loosely mounted on each end a roll 11 which fits the walls of the slot 10 and forms an antifriction bearing. The knives are given their reciprocating movement over the bed 2 by means of a swinging handle 12 which is pivoted to the knife carrier at 13.

The head 8 is provided with a pair of forwardly-extending arms 14, the ends of which embrace the lever 12 and are pivoted thereto at 15. The lever 12 is provided at its upper end with a handle 16 by which it may be manipulated. When the lever 12 is swung toward the right Fig. 1, as indicated by dotted lines, this will operate to draw the head 8 toward the right thus drawing the knives 6 through the meat 3 which may be on the bed 2.

The knives are given a positive rotating movement as they are moved back and forth over the bed by means similar to that shown in my above-mentioned Patent No. 1,614,047. Each side of the knife carrier 4 is provided with a rack 17 with which meshes a gear 18 fast on the shaft 7. The gears are maintained in mesh with the racks 17 by the engagement of the rolls 11 with the upper walls of the slots 10 and hence as the head 8 is moved back and forth by the swinging movement of the lever 12 the knives 6 will be given a rapid rotation thus slitting the meat. The gears 18 are considerably smaller in diameter than the knives 6 so that the cutting edges of the knives have a drawing cutting action on the meat.

The meat is held on the bed 2 by a combined clamping and stripper plate 19 which is removably carried by the knife carrier 4. This stripper plate is provided with slits 20 through which the knives 6 project and it is acted upon by springs which yieldingly press it against the meat. The springs herein shown are in the form of leaf springs 21, there being a spring at each side of the stripper plate and each spring having a curved or bow shape. The ends of the spring are provided with slots 22 through which bolts or screws 23 pass and these springs are situated directly beneath the racks 17.

When the stripper plate is in normal position the center of the springs 21 rest against the under side of the rack 17 and the rear end of the stripper plate will be yieldingly held against a cross piece 23' formed on the knife carrier 4 and the front end will be supported by a swinging button or latch 24 which is pivoted to the under side of the knife carrier 4. The stripper plate is situated between the cross piece 25 of the knife carrier 4 and two lugs 26 which serve to hold it from fore and aft movement. The stripper plate can be readily removed by swinging the knife carrier upwardly into the dotted line position Fig. 3 and then by swinging the button or latch 24 into its inoperative position.

Figure 3:
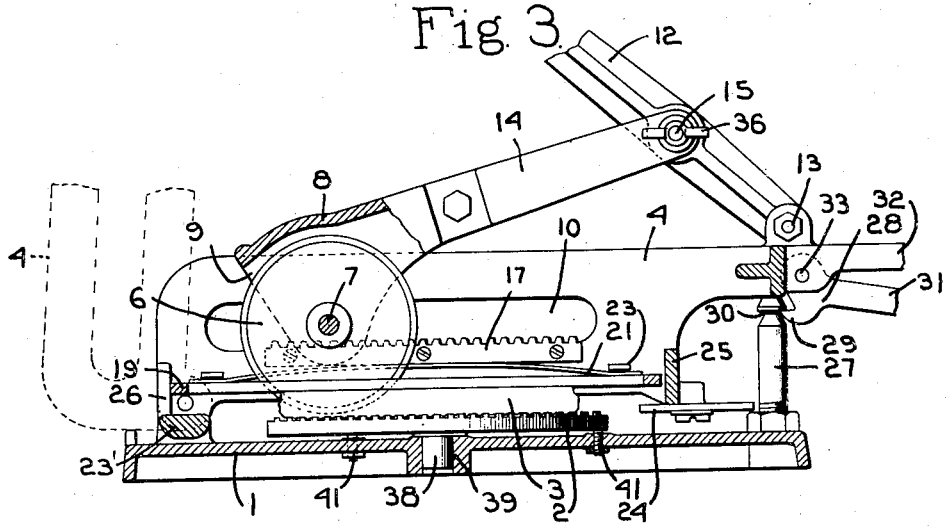
Fig. 3 is a sectional view on the line 3—3, Fig. 2.
Figure 4:
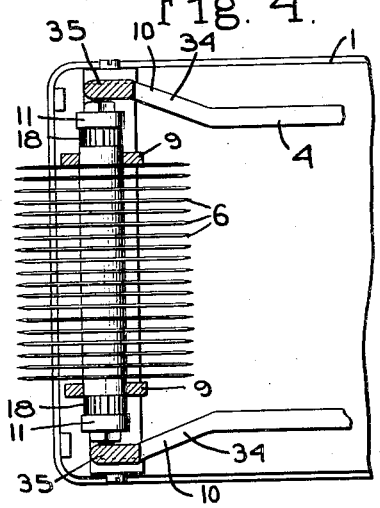
Fig. 4 is a section on the line 4—4, Fig. 1.
Figure 5:
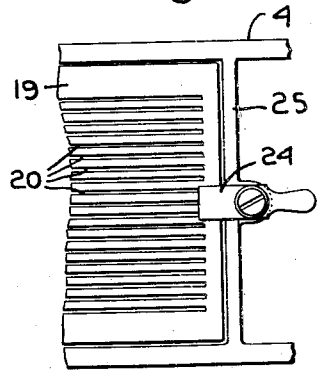
Fig. 5 is a fragmentary view showing the manner of locking the stripper plate in place.

When a piece of meat 3 is placed on the bed 2 and the knife carrier is swung into its operative position the stripper plate upon engaging the upper surface of the meat will yield upwardly as shown in Fig. 3 and will thus constitute a yielding clamp for holding the meat on the bed 2.

The knife carrier 4 is provided with means for latching it in its operative position shown in Figs. 1 and 3. For this purpose a post or rest 27 is provided which rises from the base 1 and forms a rest or support for the front end of the knife carrier 4. This knife carrier has pivoted thereto a spring-pressed latch 28 pivoted to the knife carrier at 33 and having a tooth 29 adapted to engage under a shoulder 30 formed on the post thereby locking the knife carrier in its operative position. This latch is formed with the finger piece 31 situated beneath the handle 32 of the knife carrier and is acted on by a spring 34 so that by pressing upwardly on the finger piece the latching projection 29 will be released from the shoulder 30 thereby permitting the knife carrier to be swung upwardly into the dotted line position Fig. 3 whenever it is desired to place a piece of meat on the bed or to remove said meat therefrom. When the knife carrier is swung downwardly the latch will automatically engage the shoulder 30.

In order to facilitate the removal of the knives 6 for cleaning or sharpening purposes the rear end of each side of the knife carrier 4 is offset or bent outwardly as shown at 34, the slot 10 being carried through the outwardly-flared portions 34. The flare of the portion 34 is sufficient so that the ends 35 of the sides are spaced apart a distance slightly greater than the length of the shaft 7. In order to remove the knives from the machine the stripper plate 19 will first be removed (to accomplish which the knife carrier may be swung up into the dotted line position) and then the nut 36 will be removed from the pivotal bolt 15 thereby disconnecting the arm 14 from the lever 12. The head then may be moved backwardly to carry the ends of the shaft 7 out through the portions of the slots 10 in the flaring ends 34 thus disconnecting the head entirely from the rest of the knife carrier.

Figure 6:
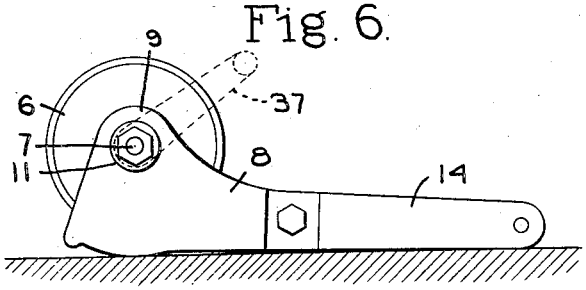
Fig. 6 is a view showing the knives removed and in position for sharpening.

For sharpening the knives I propose to lay the head 8 bottom side up on a table or support as shown in Fig. 6 and then to rotate the knives by means of a crank handle 37 which may be detachably secured to the shaft 7, a grinding stone or implement being applied to the knife edges as they are rotated. The head 8 constitutes a firm support for the knives during this sharpening process. The handle 37 will, of course, be removed from the shaft 7 when the knives are in the machine.

The bed 2 is shown as in the form of a turntable so that it may be turned after the knives have made one pass across the meat thereby to cut intersecting slits in the meat. For this purpose said bed is provided with a pivot stud 38 which is journalled in a bearing 39 formed in the base 1. The bed is provided with a handle 40 by which it may be manually turned. The base 1 carries a plurality of adjusting screws 41 by which the bed 2 may be adjusted vertically toward or from the knives. By this means it is possible to adjust the bed so that the knives will cut as deep a slit in the meat as desired. For ordinary use it will be preferable to so adjust the bed that the knives will cut nearly through the meat 3.

I claim:

1. In a device for tendering meat, the combination with a bed for supporting the meat to be tendered, of a knife carrier presenting two side members, each having one end offset and each having a knife-guiding slot which extends to the offset end, a gang of cutting knives having end extensions operating in said slots, and means to move the knives back and forth over the bed, the offset ends permitting the gang of knives to be withdrawn from said slots.

2. In a meat tenderer, the combination with a bed for supporting the meat to be tendered, of a knife carrier presenting two side members, each having a knife-guiding slot, and a gang of cutting knives having end extensions operating in said slots, and means for moving the knives back and forth over the bed, one end of each side member being offset outwardly, and the knife-guiding slots extending to the offset portions, whereby when the gang of knives is shifted into a position between the offset ends of the side members the end extensions will be withdrawn from the slots thereby disconnecting the knives from the knife carrier.

3. In a meat tenderer, the combination with a bed for supporting the meat to be tendered, said bed being turnable about a vertical axis of a knife carrier movable toward and from the bed, a gang of knives movably mounted on the knife carrier, means to move the knives relative to the knife carrier back and forth over the bed, and means for adjusting the bed vertically relative to the knives.

4. In a meat tenderer, the combination with a base, of a bed for supporting meat mounted on the base and turnable thereon about a pivot at right angles to the supporting face of the bed, a knife carrier pivoted to the base, a gang of knives carried by the knife carrier and movable relative thereto back and forth over the base, and adjusting screws carried by the base and by which the bed may be adjusted vertically.

5. In a meat tenderer, the combination with a base, of a bed for supporting the meat carried thereby, a knife carrier pivoted to the base, a gang of knives supported by said knife carrier and movable relative thereto back and forth over the bed, a stripping plate removably supported by the knife carrier and having slots through which the knives extend, and springs carried by the stripping plate and co-operating with the knife carrier to yieldingly hold said plate against the work.

6. In a meat tenderer, the combination with a base, of a bed carried thereby and on which the meat to be tendered is supported, a knife carrier pivoted to the base, a gang of knives mounted in the knife carrier and movable relative thereto over the base, said knife carrier having at its pivoted end a rest, a stripping plate supported at one end on said rest, a button or latch for supporting the other end of the stripping plate, and springs acting on the stripping plate for yieldingly holding it against said rest and button, said stripping plate being removable from the knife carrier when the button is moved into inoperative position.

7. In a meat tenderer, the combination with a base, of a table or bed thereon for supporting the meat, a knife carrier pivoted to the base and provided on each side with rack teeth, a gang of knives mounted in the knife carrier for movement relative thereto, gears rigid with said knives which mesh with the rack teeth, whereby the knives are rotated as they are moved relative to the knife carrier, said knife carrier having a rest at one end, a stripper plate supported at one end on said rest, a movable button on the knife carrier for supporting the other end of the stripper plate and springs carried by the stripper plate and engaging the rack teeth for yieldingly holding the stripper plate against the meat, said stripper plate being removable from the knife carrier upon swinging the button into inoperative position.

8. In a device for tendering meat, the combination with a bed for supporting the meat to be tendered, of a knife carrier presenting two side members, each having one end offset and each having a knife-guiding slot which extends to the offset end, a gang of circular cutting knives, a shaft on which said knives are rigidly mounted, the ends of said shaft operating in said slots, a rack secured to each side member, pinions fast on said shaft meshing with said racks, said pinions being considerably smaller than the circular knives, and means to move the knives back and forth over the bed, the offset ends of the sides permitting the gang of knives to be withdrawn from the slots.

In testimony whereof, I have signed my name to this specification.

JOSEPH P. SPANG.